United States Patent
Serra et al.

(10) Patent No.: US 11,661,987 B2
(45) Date of Patent: May 30, 2023

(54) SENSOR-EQUIPPED VEHICLE BRAKING SYSTEMS, DEVICES, AND METHODS

(71) Applicant: ITT ITALIA S.r.l., Barge (IT)

(72) Inventors: Stefano Serra, Saluzzo (IT); Daniele Donzelli, Luserna san Giovanni (IT); Marco Terranova, Turin (IT); Mattia Solari, Barge (IT); Luca Martinotto, Legnano (IT)

(73) Assignee: ITT ITALIA S.r.l., Barge (IT)

( * ) Notice: Subject to any disclaimer, the term of this patent is extended or adjusted under 35 U.S.C. 154(b) by 21 days.

(21) Appl. No.: 16/584,514

(22) Filed: Sep. 26, 2019

(65) Prior Publication Data

US 2020/0124124 A1 Apr. 23, 2020

Related U.S. Application Data

(63) Continuation of application No. 15/268,039, filed on Sep. 16, 2016, now Pat. No. 10,495,168.

(30) Foreign Application Priority Data

Sep. 17, 2015 (IT) .......................... 102015000052635

(51) Int. Cl.
*F16D 66/00* (2006.01)
*G01L 1/16* (2006.01)
(Continued)

(52) U.S. Cl.
CPC .............. *F16D 66/00* (2013.01); *B60T 8/885* (2013.01); *B60T 17/22* (2013.01); *F16D 66/021* (2013.01);
(Continued)

(58) Field of Classification Search
CPC ...... F16D 66/00; F16D 66/028; F16D 66/021; F16D 2066/003; F16D 2066/005;
(Continued)

(56) References Cited

U.S. PATENT DOCUMENTS

| | | |
|---|---|---|
| 2,117,027 A | 5/1938 | Langbein |
| 2,289,954 A | 7/1942 | Arndt |
| | (Continued) | |

FOREIGN PATENT DOCUMENTS

| | | |
|---|---|---|
| CN | 1678893 | 10/2005 |
| CN | 102317130 | 1/2012 |
| | (Continued) | |

OTHER PUBLICATIONS

Ait-Hammouda, Islam; "Jumps and Synchronization in Anti-Lock Brake Algorithms"; Oct. 2008, Japan, 7 pages; https://hal.archives-ouvertes.fr/hal-00525788.

(Continued)

*Primary Examiner* — Thomas Ingram
(74) *Attorney, Agent, or Firm* — Knobbe Martens Olson & Bear LLP

(57) ABSTRACT

Methods, devices, and systems, for analyzing and managing data generated by a sensor-equipped braking system for vehicles, comprising a support element a block of friction material, at least one sensor interposed between the block of friction material and the support element, comprising at least one central control unit capable of receiving in real time from the sensor means at least the basic data related to one or more of the pressure of the activated braking system, the temperature of the activated braking system, the braking torque, the residual braking torque when the braking system is deactivated, and the wear on the braking system during and after activation thereof. The system can also include one or more auxiliary sensors.

18 Claims, 7 Drawing Sheets

(51) Int. Cl.
  *B60T 17/22* (2006.01)
  *B60T 8/88* (2006.01)
  *F16D 66/02* (2006.01)
  *G01L 5/28* (2006.01)
  *F16D 55/225* (2006.01)

(52) U.S. Cl.
  CPC .............. *F16D 66/028* (2013.01); *G01L 1/16* (2013.01); *B60T 2270/406* (2013.01); *F16D 55/225* (2013.01); *F16D 2066/001* (2013.01); *F16D 2066/003* (2013.01); *F16D 2066/005* (2013.01); *F16D 2066/006* (2013.01); *G01L 5/284* (2013.01)

(58) Field of Classification Search
  CPC ......... F16D 2066/001; F16D 2066/006; F16D 55/225; B60T 8/885; B60T 17/22; B60T 2270/406; G01L 1/16; G01L 5/28
  See application file for complete search history.

(56) References Cited

U.S. PATENT DOCUMENTS

| | | |
|---|---|---|
| 3,689,880 A | 9/1972 | McKee et al. |
| 3,724,916 A | 4/1973 | Hirzel |
| 3,902,157 A | 8/1975 | Kita et al. |
| 4,023,864 A | 5/1977 | Lang et al. |
| 4,117,451 A | 9/1978 | Sato et al. |
| 4,298,857 A | 11/1981 | Robins et al. |
| 4,456,098 A | 6/1984 | Lindre |
| 4,484,280 A | 11/1984 | Brugger et al. |
| 4,495,434 A | 1/1985 | Diepers et al. |
| 4,602,702 A | 7/1986 | Ohta et al. |
| 4,623,044 A * | 11/1986 | Ohta .................... B60T 8/344 188/158 |
| 4,649,370 A | 3/1987 | Thomason |
| 4,782,319 A | 11/1988 | Dell'Acqua et al. |
| 4,854,424 A | 8/1989 | Yamatoh et al. |
| 4,869,350 A | 9/1989 | Fargier et al. |
| 4,901,055 A | 2/1990 | Rosenberg et al. |
| 4,928,030 A | 5/1990 | Culp |
| 5,090,518 A | 2/1992 | Schenk et al. |
| 5,099,962 A | 3/1992 | Furusu et al. |
| 5,115,162 A | 5/1992 | Leonard et al. |
| 5,133,431 A | 7/1992 | Braun |
| 5,176,034 A | 1/1993 | Hazony et al. |
| 5,235,135 A | 8/1993 | Knecht et al. |
| 5,302,940 A | 4/1994 | Chen |
| 5,325,011 A | 6/1994 | Kahn |
| 5,404,067 A | 4/1995 | Stein |
| 5,406,682 A | 4/1995 | Zimnicki et al. |
| 5,416,415 A | 5/1995 | Dorri et al. |
| 5,419,415 A | 5/1995 | Lamb et al. |
| 5,660,215 A | 8/1997 | Nishikawa et al. |
| 5,719,577 A | 2/1998 | Pitot et al. |
| 5,839,545 A | 11/1998 | Preston et al. |
| 6,064,970 A | 5/2000 | McMillan et al. |
| 6,122,585 A | 9/2000 | Ono et al. |
| 6,179,091 B1 | 1/2001 | Takanashi |
| 6,204,786 B1 | 3/2001 | Bieth et al. |
| 6,247,560 B1 | 6/2001 | Bunker |
| 6,310,545 B1 | 10/2001 | Sapir |
| 6,339,956 B1 | 1/2002 | Huinink et al. |
| 6,345,225 B1 | 2/2002 | Bohm et al. |
| 6,414,818 B1 | 7/2002 | Tanimoto |
| 6,477,893 B1 | 11/2002 | Djordjevic |
| 6,529,803 B2 | 3/2003 | Meyers et al. |
| 6,549,126 B2 | 4/2003 | Hageman et al. |
| 6,612,736 B2 | 9/2003 | Lee et al. |
| 6,668,983 B2 | 12/2003 | Drennen et al. |
| 6,681,631 B2 | 1/2004 | Apel |
| 6,813,581 B1 | 11/2004 | Snyder |
| 6,823,242 B1 | 11/2004 | Ralph |
| 6,934,618 B2 | 8/2005 | Eckert et al. |
| 7,124,639 B1 * | 10/2006 | Kurtz .................... G01L 9/0055 73/708 |
| 7,127,948 B2 | 10/2006 | Tavares et al. |
| 7,331,427 B2 | 2/2008 | Mohr |
| 7,451,653 B1 | 11/2008 | Sippola |
| 7,694,555 B2 | 4/2010 | Howell et al. |
| 8,026,802 B2 | 9/2011 | Shimura |
| 8,287,055 B2 | 10/2012 | Lee |
| 8,310,356 B2 | 11/2012 | Evans et al. |
| 8,437,934 B2 | 5/2013 | Degenstein |
| 8,573,045 B2 | 11/2013 | Gotschlich |
| 8,676,721 B2 | 3/2014 | Piovesan et al. |
| 8,717,158 B2 | 5/2014 | Roach |
| 8,729,938 B2 | 5/2014 | Watanabe |
| 8,789,896 B2 | 7/2014 | Albright et al. |
| 8,958,966 B2 | 2/2015 | Nohira et al. |
| 9,187,099 B2 | 11/2015 | Powers et al. |
| 9,269,202 B2 | 2/2016 | Phelan et al. |
| 9,286,736 B2 | 3/2016 | Punjabi et al. |
| 9,316,278 B2 | 4/2016 | Moore et al. |
| 9,353,815 B1 | 5/2016 | Eden |
| 9,415,757 B2 | 8/2016 | Martinotto et al. |
| 9,635,467 B2 | 4/2017 | Miyoshi et al. |
| 9,827,961 B2 * | 11/2017 | Spieker .................... B60T 8/885 |
| 9,939,035 B2 | 4/2018 | Donzelli et al. |
| 9,964,167 B2 | 5/2018 | Martinotto et al. |
| 9,988,024 B2 | 6/2018 | Schwartz et al. |
| 10,052,957 B2 | 8/2018 | Azzi |
| 10,138,968 B2 | 11/2018 | Serra et al. |
| 10,208,822 B2 | 2/2019 | Donzelli et al. |
| 10,224,128 B2 | 3/2019 | Lee |
| 10,227,064 B2 | 3/2019 | Serra et al. |
| 10,295,006 B2 | 5/2019 | Serra et al. |
| 10,408,292 B2 | 9/2019 | Donzelli et al. |
| 10,451,130 B2 | 10/2019 | Solari et al. |
| 10,495,168 B2 | 12/2019 | Serra et al. |
| 10,598,239 B2 | 3/2020 | Martinotto et al. |
| 10,677,304 B2 | 6/2020 | Donzelli et al. |
| 10,955,017 B2 | 3/2021 | Serra et al. |
| 11,047,440 B2 | 6/2021 | Serra et al. |
| 2001/0042661 A1 | 11/2001 | Treyde |
| 2001/0049577 A1 | 12/2001 | Kesselgruber |
| 2002/0047496 A1 | 4/2002 | Wierach |
| 2002/0095253 A1 | 7/2002 | Losey et al. |
| 2002/0104717 A1 | 8/2002 | Borugian |
| 2003/0111305 A1 | 6/2003 | Drennen et al. |
| 2004/0015283 A1 | 1/2004 | Eckert et al. |
| 2004/0041464 A1 | 3/2004 | Eckert et al. |
| 2004/0187591 A1 | 9/2004 | Baumann et al. |
| 2004/0238299 A1 | 12/2004 | Ralea et al. |
| 2004/0242803 A1 | 12/2004 | Ohme et al. |
| 2005/0029056 A1 | 2/2005 | Baumgartner et al. |
| 2005/0103580 A1 | 5/2005 | Kramer |
| 2005/0236104 A1 | 10/2005 | Tanaka |
| 2005/0251306 A1 * | 11/2005 | Gowan .................... G01P 1/122 701/71 |
| 2006/0016055 A1 | 1/2006 | Wilkie et al. |
| 2006/0076196 A1 | 4/2006 | Palladino |
| 2006/0254868 A1 | 11/2006 | Thiesing et al. |
| 2007/0024113 A1 * | 2/2007 | Thrush .................... F16D 66/00 303/155 |
| 2007/0228824 A1 | 10/2007 | Yasukawa et al. |
| 2007/0235268 A1 | 10/2007 | Caron |
| 2007/0284713 A1 | 12/2007 | Ninomiya et al. |
| 2008/0246335 A1 * | 10/2008 | Spieker .................... B60T 8/885 303/122.08 |
| 2009/0033146 A1 | 2/2009 | Rieth et al. |
| 2009/0133971 A1 | 5/2009 | Baier-Welt |
| 2009/0157358 A1 * | 6/2009 | Kim .................... G01M 5/0033 702/185 |
| 2009/0187324 A1 | 7/2009 | Lu et al. |
| 2009/0218179 A1 | 9/2009 | Yokoyama et al. |
| 2009/0223282 A1 | 9/2009 | Yamazaki |
| 2009/0289529 A1 | 11/2009 | Ito |
| 2010/0032898 A1 | 2/2010 | Gearty |
| 2010/0186938 A1 | 7/2010 | Murata et al. |
| 2010/0210745 A1 | 8/2010 | McDaniel |
| 2010/0221249 A1 | 8/2010 | McClellan |
| 2010/0250081 A1 | 9/2010 | Kinser et al. |

(56) References Cited

U.S. PATENT DOCUMENTS

| | | | |
|---|---|---|---|
| 2010/0318258 A1* | 12/2010 | Katayama | G07C 5/0858 |
| | | | 701/31.4 |
| 2011/0050406 A1 | 3/2011 | Hennig et al. | |
| 2011/0125381 A1 | 5/2011 | Szell et al. | |
| 2012/0055257 A1 | 3/2012 | Shaw-Klein | |
| 2013/0013348 A1* | 1/2013 | Ling | G06Q 40/08 |
| | | | 705/4 |
| 2013/0018266 A1 | 1/2013 | Nishikubo | |
| 2013/0048443 A1 | 2/2013 | Muramatsu et al. | |
| 2013/0192933 A1 | 8/2013 | King et al. | |
| 2014/0097951 A1 | 4/2014 | Grgic | |
| 2014/0200784 A1 | 7/2014 | Nohira et al. | |
| 2014/0257605 A1* | 9/2014 | Beck | B60W 10/20 |
| | | | 701/19 |
| 2014/0311833 A1* | 10/2014 | Martinotto | G01L 5/225 |
| | | | 188/1.11 E |
| 2014/0337086 A1 | 11/2014 | Asenjo et al. | |
| 2014/0357605 A1 | 12/2014 | Beck | |
| 2015/0112515 A1 | 4/2015 | Conway | |
| 2016/0014526 A1 | 1/2016 | Miyoshi et al. | |
| 2016/0084331 A1 | 3/2016 | Merlo et al. | |
| 2016/0146279 A1 | 5/2016 | Philpott | |
| 2016/0272176 A1 | 9/2016 | Furuyama | |
| 2016/0341622 A1 | 11/2016 | Mensa | |
| 2017/0002883 A1 | 1/2017 | Donzelli et al. | |
| 2017/0030424 A1 | 2/2017 | Martinotto et al. | |
| 2017/0052028 A1* | 2/2017 | Choudhury | G01C 21/30 |
| 2017/0082163 A1 | 3/2017 | Serra et al. | |
| 2017/0082164 A1 | 3/2017 | Serra et al. | |
| 2017/0082165 A1 | 3/2017 | Donzelli et al. | |
| 2017/0082166 A1 | 3/2017 | Serra et al. | |
| 2017/0082167 A1 | 3/2017 | Serra et al. | |
| 2017/0267220 A1 | 9/2017 | Serra et al. | |
| 2017/0331030 A1 | 11/2017 | Inoue et al. | |
| 2018/0106319 A1 | 4/2018 | Solari et al. | |
| 2018/0160248 A1 | 6/2018 | Murakami et al. | |
| 2018/0231084 A1 | 8/2018 | Donzelli et al. | |
| 2018/0244159 A1 | 8/2018 | Satterthwaite et al. | |
| 2018/0306262 A1 | 10/2018 | Martinotto et al. | |
| 2019/0003541 A1 | 1/2019 | Serra et al. | |
| 2019/0005743 A1 | 1/2019 | Serra et al. | |
| 2019/0078630 A1 | 3/2019 | Serra et al. | |
| 2019/0241166 A1 | 8/2019 | Serra et al. | |
| 2019/0249736 A1 | 8/2019 | Donzelli et al. | |
| 2019/0338818 A1 | 11/2019 | Serra et al. | |
| 2019/0351889 A1 | 11/2019 | Serra et al. | |
| 2020/0088256 A1 | 3/2020 | Solari et al. | |
| 2021/0071728 A1 | 3/2021 | Serra et al. | |
| 2021/0148427 A1 | 5/2021 | Martinotto et al. | |
| 2021/0348666 A1 | 11/2021 | Serra et al. | |
| 2021/0388878 A1 | 12/2021 | Serra et al. | |

FOREIGN PATENT DOCUMENTS

| | | |
|---|---|---|
| CN | 102658812 | 9/2012 |
| CN | 102785648 | 11/2012 |
| CN | 104813060 | 2/2018 |
| CN | 104821372 | 6/2018 |
| DE | 100 06 012 A1 | 9/2000 |
| DE | 102 30 008 A1 | 1/2004 |
| DE | 10230008 | 1/2004 |
| DE | 10243127 A1 | 3/2004 |
| DE | 10259629 A1 | 7/2004 |
| DE | 10 2005 052630 A1 | 3/2007 |
| DE | 10 2006 018 952 | 10/2007 |
| DE | 10 2006 018 952 A1 | 10/2007 |
| DE | 10 2006 053 489 | 5/2008 |
| DE | 10 2006 053 489 B4 | 5/2008 |
| DE | 10 2010 010482 A1 | 8/2011 |
| DE | 102011006002 | 9/2012 |
| DE | 10-2012-007118 | 10/2013 |
| EP | 0 189 076 A2 | 7/1986 |
| EP | 0 601 681 A1 | 6/1995 |
| EP | 0744558 A1 | 11/1996 |
| EP | 0781936 B1 | 7/1997 |
| EP | 1431606 A1 | 6/2004 |
| EP | 1530037 A1 | 5/2005 |
| EP | 1531110 | 5/2005 |
| EP | 1531110 A2 | 5/2005 |
| EP | 1923592 B1 | 5/2008 |
| EP | 2647866 | 10/2013 |
| EP | 2741063 A1 | 6/2014 |
| EP | 2778462 A1 | 9/2014 |
| EP | 2570691 A1 | 10/2014 |
| FR | 2 815 040 A1 | 4/2002 |
| FR | 2815040 A1 | 4/2002 |
| GB | 2309057 | 7/1997 |
| GB | 2309057 A | 7/1997 |
| GB | 2372825 A | 9/2002 |
| GB | 2478423 | 9/2011 |
| GB | 2478423 A | 9/2011 |
| JP | S57-011143 | 1/1982 |
| JP | S58-206458 | 12/1983 |
| JP | S61275049 | 12/1986 |
| JP | 04-054326 | 2/1992 |
| JP | H07-002107 | 1/1995 |
| JP | H09-002240 | 1/1997 |
| JP | H11 94707 A | 4/1999 |
| JP | H11-125285 | 5/1999 |
| JP | 2002-130348 A | 5/2002 |
| JP | 2002-538039 | 11/2002 |
| JP | 2003-104139 | 4/2003 |
| JP | 2003-205833 | 7/2003 |
| JP | 2005-035344 | 2/2005 |
| JP | 2006-193091 | 7/2006 |
| JP | 2006-193091 A | 7/2006 |
| JP | 2007-224988 | 9/2007 |
| JP | 2011-116237 | 6/2011 |
| JP | 2012-202983 | 10/2012 |
| JP | 2014-234158 | 12/2014 |
| JP | 2016-516631 | 6/2016 |
| JP | 2016-521336 | 7/2016 |
| KR | 1020020051429 | 6/2002 |
| KR | 2004-0048957 A | 6/2004 |
| KR | 1020070027041 | 3/2007 |
| KR | 100791632 | 12/2007 |
| KR | 2009-0057640 A | 6/2009 |
| KR | 2009 0057640 A | 6/2009 |
| KR | 10-2004-48957 | 6/2010 |
| KR | 2011-0043849 A | 4/2011 |
| KR | 2011 0043849 A | 4/2011 |
| KR | 1020130039804 | 4/2013 |
| KR | 1020150045047 | 4/2015 |
| KR | 10-2016-0174510 | 12/2016 |
| KR | 10-2015-0143696 | 12/2019 |
| WO | WO 1999/08018 | 2/1999 |
| WO | WO 2004/027433 | 4/2004 |
| WO | WO 2014/170726 | 10/2014 |
| WO | WO 2014/170726 A1 | 10/2014 |
| WO | WO 2014/170849 | 10/2014 |
| WO | WO 2014/170849 A1 | 10/2014 |
| WO | WO 2015/013217 A1 | 1/2015 |
| WO | WO 2016/038533 A1 | 3/2016 |
| WO | WO 2016/189150 | 12/2016 |
| WO | WO 2018/019438 | 2/2018 |
| WO | WO 2019/171289 | 9/2019 |

OTHER PUBLICATIONS

Capra, D. et al.; An ABS Control Logic Based on Wheel Force Measurement. In: Vehicle System Dynamics; vol. 50, No. 12, pp. 1779-1796; http://porto.polito.it/2497487/.

Italian Search Report, IO 58761 (IT UB20153706), dated May 25, 2016, 8 pages.

Italian Search Report, IO 58837 (IT UB20153709), dated May 31, 2016, 7 pages.

International Search Report and Written Opinion; International Application No. PCT/EP2017/054455, filed on Feb. 27, 2017; dated May 3, 2017.

European Search Report; European Application No. EP 14158449; dated Aug. 6, 2014.

(56) References Cited

OTHER PUBLICATIONS

Gustafsson, Fredrik; "Slip-based Tire-Road Friction Estimation"; Automatica, 1997; vol. 33, No. 6; pp. 1087-1099.
International Search Report; International Application No. PCT/IB2013/060881; dated Jul. 3, 2014.
International Search Report; International Application No. PCT/IB2014/060778; dated Aug. 6, 2014.
International Search Report; International Application No. PCT/IB2015/056861; dated Jan. 18, 2016.
Italian Search Report and Written Opinion for IT TO2013A000307; dated Mar. 7, 2014, in 3 pages.
Italian Search Report and Written Opinion for Italian Patent Application No. IT UB20151029; dated May 28, 2015; 8 pages.
Italian Search Report and Written Opinion for Italian Patent Application No. IT UB201510291; dated May 28, 2015; 7 pages.
Italian Search Report and Written Opinion for Italian Patent Application No. IT UB20151059; dated May 28, 2015; 7 pages.
Italian Search Report and Written Opinion for Italian Patent Application No. IT UB20151184; dated May 28, 2015; 7 pages.
Italian Search Report and Written Opinion for ITTO 20130307; dated Mar. 7, 2014; 7 pages.
Italian Search Report Coversheet for Italian Patent Application No. 102015000018714/ITUB20151184; dated Jan. 26, 2016; 1 page.
Italian Search Report Coversheet for Italian Patent Application No. 102015000018748/ITUB20151291; dated Feb. 3, 2016; 1 page.
Italian Search Report Coversheet Italian Patent Application No. 102015000018701 ITUB20151029; dated Feb. 3, 2016; 1 page.
Italian Search Report for Italian Patent Application No. 102015000018771 (UB20151059); dated Jan. 27, 2016; 1 page.
Italian Search Report for Italian Patent Application No. IO 56568 IT (UB20151059); dated Jan. 27, 2016; 1 page.
Italian Search Report for Italian Patent Application No. IO 56568 IT (UB20151059); dated Jan. 20, 2016; 7 pages.
Italian Search Report for Italian Patent Application No. IO 56584/ITUB20151184; dated Jan. 14, 2016; 7 pages.
Italian Search Report for Italian Patent Application No. IO 56597/ITUB20151291; dated Jan. 25, 2016; 7 pages.
Italian Search Report Italian Patent Application No. IO 56565/ITUB20151029; dated Jan. 22, 2016; 8 pages.
Pasillas-Lepine, William; "Hybrid Modeling and Limit Cycle Analysis for a Class of Five-Phase Anti-Lock Brake Algorithms"; Feb. 1, 2006; vol. 44, No. 2; pp. 173-188.
Ray, Laura; "Nonlinear Tire Force Estimation and Road Friction Identification: Simulation and Experiments"; Automatica, vol. 33, No. 10, pp. 1819-1833; 1997.
Solyom, Stefan, et al.; "Synthesis of a Model-Based Tire Slip Controller"; 2004; Vehicle System Dynamics, pp. 475-499; http://dx.doi.org/10.1080/0042311051233313868.
"The Next Generation of Hub Units"; SKF Group; 2012, www.vsm.skf.com; 32 pages.
Von Wagner, et al.: Active Control of Brake Squeal Via "Smart Pads"; Oct. 10, 2004.
Yi, Jingang; "Emergency Braking Control with an Observer-based Dynamic Tire/Rotation Friction Model and Wheel Angular Velocity Measurement"; Vehicle System Dynamics; 2003, vol. 39, No. 2; pp. 81-97.
U.S. Appl. No. 15/167,883 and its entire file history, filed May 27, 2016, Serra et al.
U.S. Appl. No. 15/184,806 and its entire file history, filed Jun. 16, 2016, Martinotto et al.
U.S. Appl. No. 15/268,179 and its entire file history, filed Sep. 16, 2016, Serra et al.
U.S. Appl. No. 15/947,008 and its entire file history, filed Apr. 6, 2018, Donzelli et al.
U.S. Appl. No. 16/020,680 and its entire file history, filed Jun. 27, 2018, Donzelli et al.
U.S. Appl. No. 16/250,856 and its entire file history, filed Jan. 17, 2019, Serra et al.
Italian Search Report Coversheet for Italian Patent Application No. 102015000018701 ITUB20151029; dated Feb. 3, 2016; 1 page.
"The Next Generation Hub Units"; SKF Group; 2012,www.vsm.skf.com; 32 page.
Italian Search Report for Italian Patent Application No. IO 56565/ITUB20151029; dated Jan. 22, 2016; 8 pages.
Internation Search Report; Internaional Application No. PCT/IB2015/056861; dated Jan. 18, 2016.
Italian Search Report and Written Opinion for Italian Patent Application No. IT UB20151291; dated May 28, 2015; 7 pages.
Italian Sarch Report and Written Opinion for Italian Patent Application No. IT UB20151184; dated May 28, 2015; 7 pages.
Von Wagner, et al.; Active Control of Brake Squal Via "Smart Pads"; Oct. 10, 2004.
International Search Report in PCT Application No. PCT/EP2016/071865 dated Dec. 13, 2016 in 3 pages.
International Search Report and Written Opinion; International Application No. PCT/EP2017/059238; dated Aug. 10, 2017.
Chinese Office Action in Chinese Application No. 201680054121.1 dated Mar. 26, 2019 in 9 pages.
Chinese Office Action in Chinese Application No. 201680054121.1 dated Feb. 3, 2020 in 8 pages.
Chinese Office Action in Chinese Application No. 201680054121.1 dated Nov. 4, 2020 in 8 pages.
Chinese Office Action in Chinese Application No. 201680054121.1 dated Jan. 19, 2021 in 28 pages.
Chinese Office Action in Chinese Application No. 201780011871.5, dated Jun. 17, 2020 in 15 pages.
Chinese Search Report in Chinese Application No. 201780011871.5, dated Jun. 10, 2020 in 2 pages.
European Office Action in European Application No. 16770243.0 dated Oct. 15, 2019 in 5 pages.
European Office Action in European Application No. 16770243.0 dated Jan. 12, 2020 in 3 pages.
European Office Action in European Application No. 16770243.0 dated Jun. 23, 2020 in 5 pages.
Indian Office Action Indian Application No. 201837009364 (PCC15904) dated Nov. 20, 2020 in 15 pages.
Official European Communication in European Application No. 16770243.0 dated Oct. 19, 2020 in 11 pages.
Written Opinion in PCT Application No. PCT/EP2016/071865 dated Dec. 13, 2020 in 6 pages.
Written Opinion in Japanese Application No. 2018513655 dated Oct. 12, 2020 in 4 pages.
Written Opinion in Japanese Application No. 2018-545192, dated Feb. 24, 2021, in 6 pages.
Written Amendment in Japanese Application No. 2018513655 dated Oct. 12, 2020 in 5 pages.
Japanese Written Amendment in Japanese Application No. 2018545192, dated Feb. 24, 2021 in 8 pages.
Italian Search Report and Written Opinion for Italian Patent Application No. IT 201600077944 (IO 69013); dated May 26, 2017; 8 pages.
Japanese Office Action in Japanese Application No. 2018513655 dated Jul. 14, 2020 in 16 pages.
Japanese Office Action in Japanese Application No. 2018-545192, dated Jan. 5, 2021, in 17 pages.
Japanese Search Report in Japanese Application No. 2018513655 (0022000625) dated May 25, 2020 in 12 pages.
Italian Search Report and Written Opinion for Application No. IT201900015839, dated Apr. 21, 2020, in 6 pages.
Chinese Office Action in Chinese Application No. 201980033093.9, dated Sep. 28, 2021, in 14 pages.
Chinese Office Action in Chinese Application No. 201980033093.9, dated Feb. 16, 2022, in 13 pages.
Office Action with English translation issued in Korean Application No. 10-2019-7004821, dated Feb. 10, 2021, in 18 pages.
Second Office Action with English translation in Chinese Application No. 201780045954.6, in 14 pages.
Search Report with English translation in Japanese Application No. JP 2019-503519, dated Dec. 10, 2020, in 22 pages.
Office Action with English translation in Japanese Application No. 2019-503519, dated Dec. 23, 2020, in 20 pages.
First Office Action with English translation in Chinese Application No. 201780045954.6, in 15 pages.

(56) References Cited

OTHER PUBLICATIONS

International Search Report and Written Opinion for Appcliation No. PCT/EP2019/062680, dated Jun. 27, 2019, in 9 pages.
Italian Search Report for Italian Application No. IT 201800005484, dated Feb. 19, 2019, in 7 pages.
European Search Report and Opinion for EP Application No. 20193831.3, in 2 pages.
PCT International Search Report for PCT Application No. PCT/EP2016/071859, dated Nov. 11, 2016, in 3 pages.
International Preliminary Reporton Patentability for PCT Application No. PCT/EP2016/071859, dated Mar. 20, 2018, in 6 pages.
Written Opinion for Japanese Application No. 2018-513768, dated Apr. 16, 2021, in 2 pages.
Notice of Reasons for Refusal for Japanese Application No. 2018-513768, dated Jan. 26, 2021, in 12 pages.
First Office Action in Chinese Application No. 201680052796.2, dated Sep. 19, 2019, in 11 pages.
Second Office Action in Chinese Application No. 201680052796.2, dated Apr. 24, 2020, in 12 pages.
Third Office Action in Chinese Application No. 201680052796.2, dated Feb. 9, 2021, in 9 pages.
First Office Action in Mexican Application No. MX/a/2018/003309, dated Sep. 4, 2019, in 3 pages.
Second Office Action in Mexican Application No. MX/a/2018/003309, dated Sep. 4, 2019, in 5 pages.

\* cited by examiner

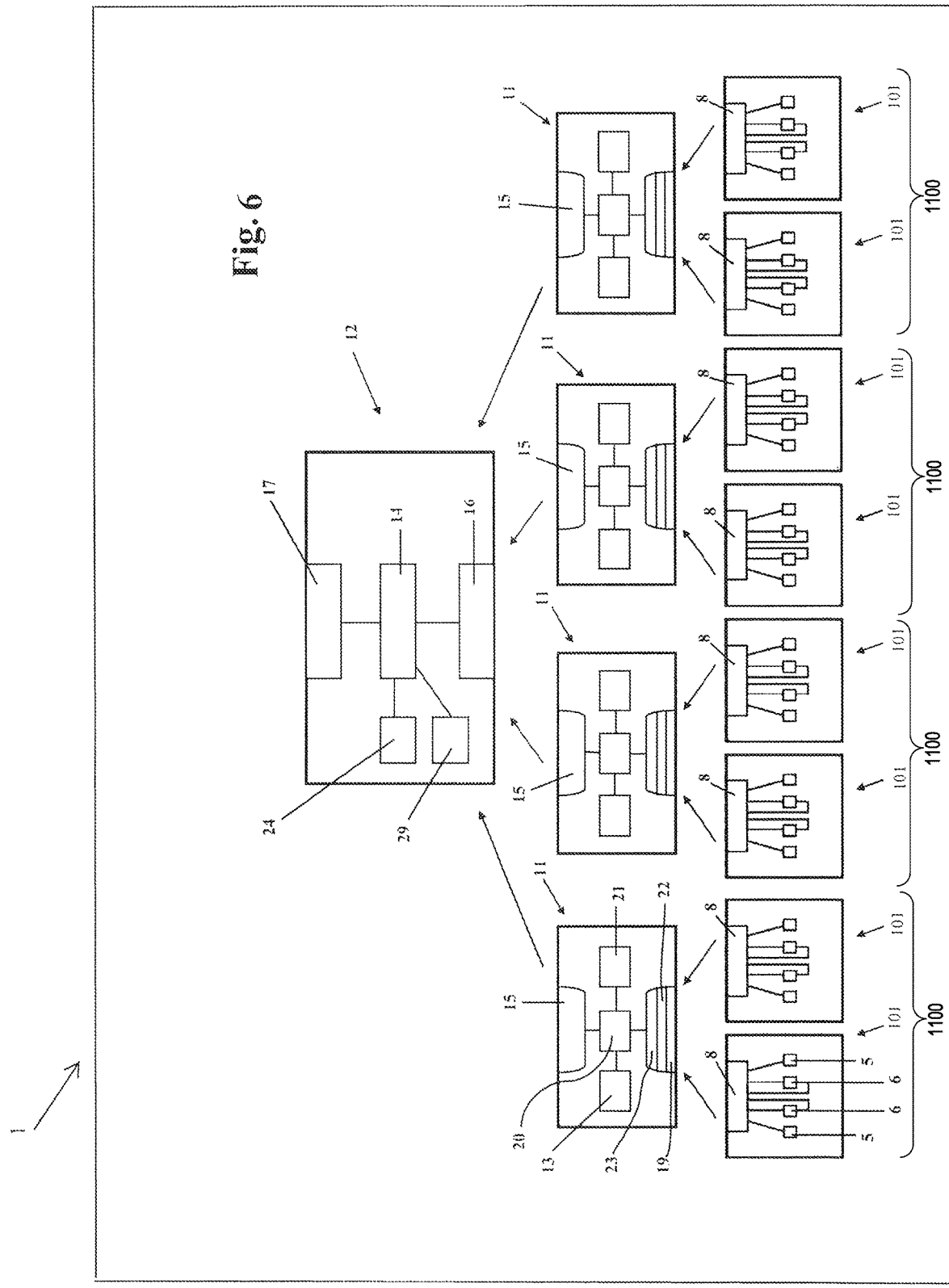

SENSOR-EQUIPPED VEHICLE BRAKING SYSTEMS, DEVICES, AND METHODS

INCORPORATION BY REFERENCE OF ANY PRIORITY APPLICATIONS

All applications for which a foreign or domestic priority claim is identified in the Application Data Sheet as filed with the present application are hereby incorporated by reference under 37 CFR 1.57.

BACKGROUND

A braking unit is a mechanical apparatus that diverts energy from a moving system, thereby reducing the motion of the moving system. A braking unit is typically used for slowing or stopping a moving vehicle, such as by friction between a generally non-rotating brake pad and a rotating brake disk or drum. The brake pad can be pressed against the brake disk or drum by a brake caliper.

SUMMARY OF CERTAIN EMBODIMENTS

The present disclosure relates to systems, devices, and methods for analyzing and managing of data generated by sensor-equipped vehicle braking systems.

Vehicle braking devices can include a block of friction material supported by a metallic support element. According to some embodiments, one or more piezoceramic sensors and/or other sensors can be included on the braking device, such as by interposing the sensor(s) between the block of friction material and the metallic support element. Such sensors can be used to detect information during the operation of the vehicle, such as temperature, forces that are exchanged between the block of friction material and the element to be braked, a disk or drum, bound to the wheel, and the like.

According to some embodiments, detected forces and/or other detected values can be used to foresee or determine faults, defects, or other undesirable operation of the braking system. For instance, systems disclosed herein can process information received from the sensorized brake pad(s) to automatically determine undesirable operation, without relying on interaction between the braking system and one or more other parts of the vehicle and/or relying on involvement of the user of the vehicle, the manufacturer, and/or ancillary service providers.

International Publication Number No. WO2014/170726A1 and U.S. Pat. No. 9,415,757, the contents of both of which are hereby incorporated by reference herein, disclose a vehicle braking system that includes a braking element, in particular a sensorized brake pad. The brake pad has includes at least one piezoceramic sensor operating at high temperatures and capable of outputting an electrical signal when subjected to mechanical stress. Such a brake pad can detect, without the need for an external energy source, the presence and extent of the mechanical stresses which can arise at the interface between said pad and the brake disc. Such brake pads allows the capability of analyzing braking operation in order to detect, report, eliminate, and/or dramatically reduce abnormal operating conditions including phenomena such as vibrations and noise.

According to some embodiments systems and methods are provided which are capable of analyzing and managing information generated by a sensor-equipped braking system for vehicles. The braking system is able to interact in a single direction or bi-directionally with intrinsic and/or extrinsic mechanical and/or non-mechanical vehicle data during use, e.g., with auxiliary sensors which can include geo-location sensors (e.g., Global Positioning System sensor), acceleration sensors, and or speed sensors.

According to additional embodiments systems and methods analyze and manage of data generated by a sensor-equipped braking system for vehicles to provide enhanced information about vehicle operation, including information about mechanical and/or non-mechanical intrinsic and/or extrinsic vehicle data, dependent and/or independent of its user, e.g., with a high degree of precision.

Some embodiments are capable of analyzing and managing data generated by sensorized braking systems for vehicles in a manner that partially or completely reduces the need for the vehicle user, owner, or mechanic to be involved in diagnosing, managing, or maintaining certain aspects of brake system operation and/or other vehicle operation.

Embodiments disclosed herein analyze and manage data generated by a sensor-equipped vehicle braking system so as to simplify and improve or partially or completely eliminate mechanical and non-mechanical intrinsic and extrinsic vehicle problems during its use, while additionally increasing safety at relatively low cost.

These and other capabilities can be provided by systems that can analyze and manage data generated by a sensor-equipped braking system for vehicles. Such a braking system can include one or more braking elements such as a brake pad or shoe, which can include a support element, a block of friction material supported by the support element, and one or more sensors. The sensors can be supported by the support element and interposed between the block of friction material and the support element. The braking system include at least one central control unit which can receive data (e.g., in real time) from the one or more sensors. The data can include some or all of data relating to: pressure of the activated braking system, temperature of the activated braking system, braking torque, residual torque present when the braking system is deactivated, and the wear of the braking system during and after activation. For example, the brake pad or shoe can include one or more pressure and/or shear force sensors (e.g., piezoelectric sensors such as piezoceramic sensors) for measuring braking pressure, braking torque, and/or residual torque, and one or more temperature sensors, for measuring temperature of the braking device. In some embodiments, the pressure sensor and the shear sensors are piezoelectric (e.g., piezoceramic sensors) which differ in regard to the direction of the applied bias therein. For instance, the pressure sensors can be oriented to detect normal forces between the surface of the friction material and a corresponding surface of the element to be braked, whereas the shear sensors can be oriented to detect shear (e.g., lateral) forces between the surface of the friction material and the corresponding surface of the element to be braked.

Piezoceramic sensors can be configured to operate at high temperatures and/or to output an electrical signal when subjected to mechanical stress. The brake pad thus structured is able to detect in a simple and economical way, without the need for an external energy source, the presence and extent of the mechanical stresses which can arise at the interface between the pad and the brake disk. Such a brake pad can allow for the possibility of monitoring the braking, such as to reduce or eliminate phenomena (e.g., vibrations and noise) and/or to report abnormal operating conditions. The temperature of the brake pad is typically representative of the brake operating temperature. Obtaining the temperature datum from a non-rotating part of the brake system (e.g., the brake pad) avoids other limitations that are typical of measurements taken on rotating bodies, such as disk brakes or drum brakes, that render measurement complex and costly.

In some embodiments, each sensor is covered by an electrically insulating protective layer. In certain embodiments, the control units comprise an electrical power supply that is configured to absorb energy from the motion of the vehicle.

BRIEF DESCRIPTION OF THE DRAWINGS

Additional features and benefits of the inventions will become further evident from the description below. These and other features are illustrated by way of certain non-limiting examples in the accompanying drawings, in which:

FIG. 6 schematically illustrates an example of a portion of a vehicle including a plurality of control units and one or more sensor-equipped brake units.

DETAILED DESCRIPTION OF CERTAIN EMBODIMENTS

Embodiments of systems, components, and methods will now be described with reference to the accompanying figures, wherein like numerals refer to like or similar elements throughout. Although several embodiments, examples and illustrations are disclosed below, the inventions described herein extends beyond the specifically disclosed embodiments, examples, and illustrations. The inventions disclosed herein can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. Embodiments of the inventions can comprise several novel features. No single feature is solely responsible for its desirable attributes or is essential to practicing the inventions herein described.

Overview

Figure 1:
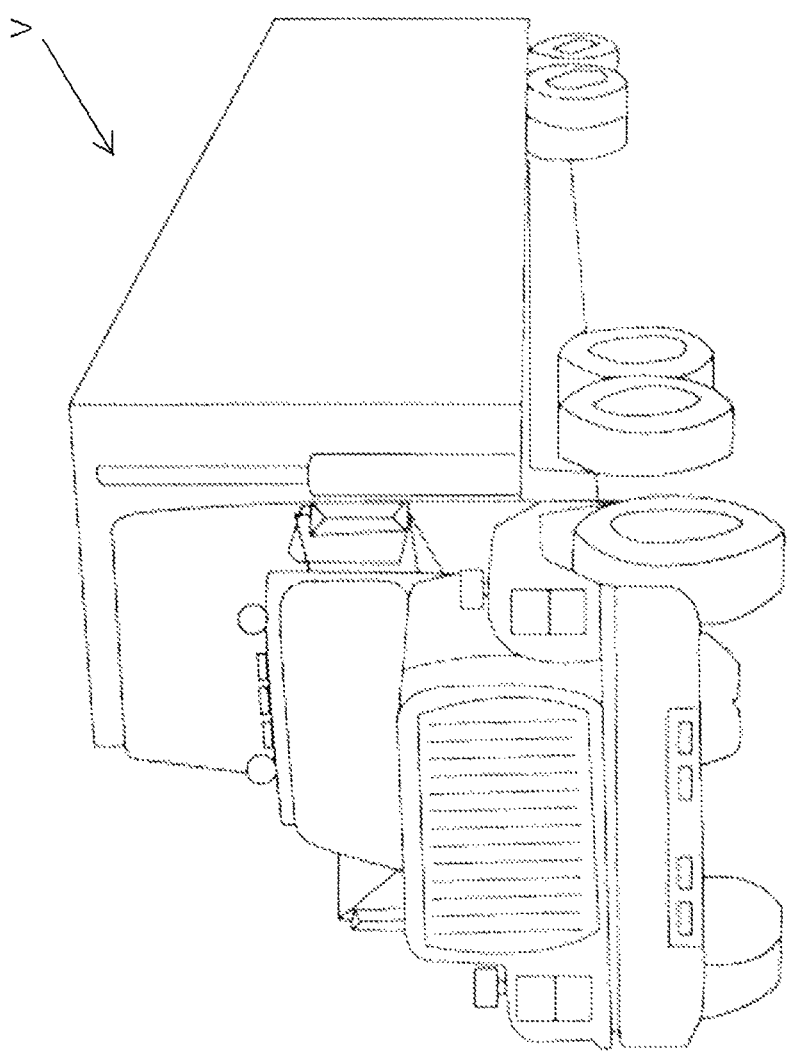
FIG. 1 illustrates a perspective view of a vehicle.

FIG. 1 illustrates an example of a vehicle V. While a heavy truck is shown, the inventions disclosed herein can be applicable to any type of vehicle including cars, trains, airplanes, bicycles, and to groups or fleets of vehicles including any combination of the foregoing.

Figure 2:
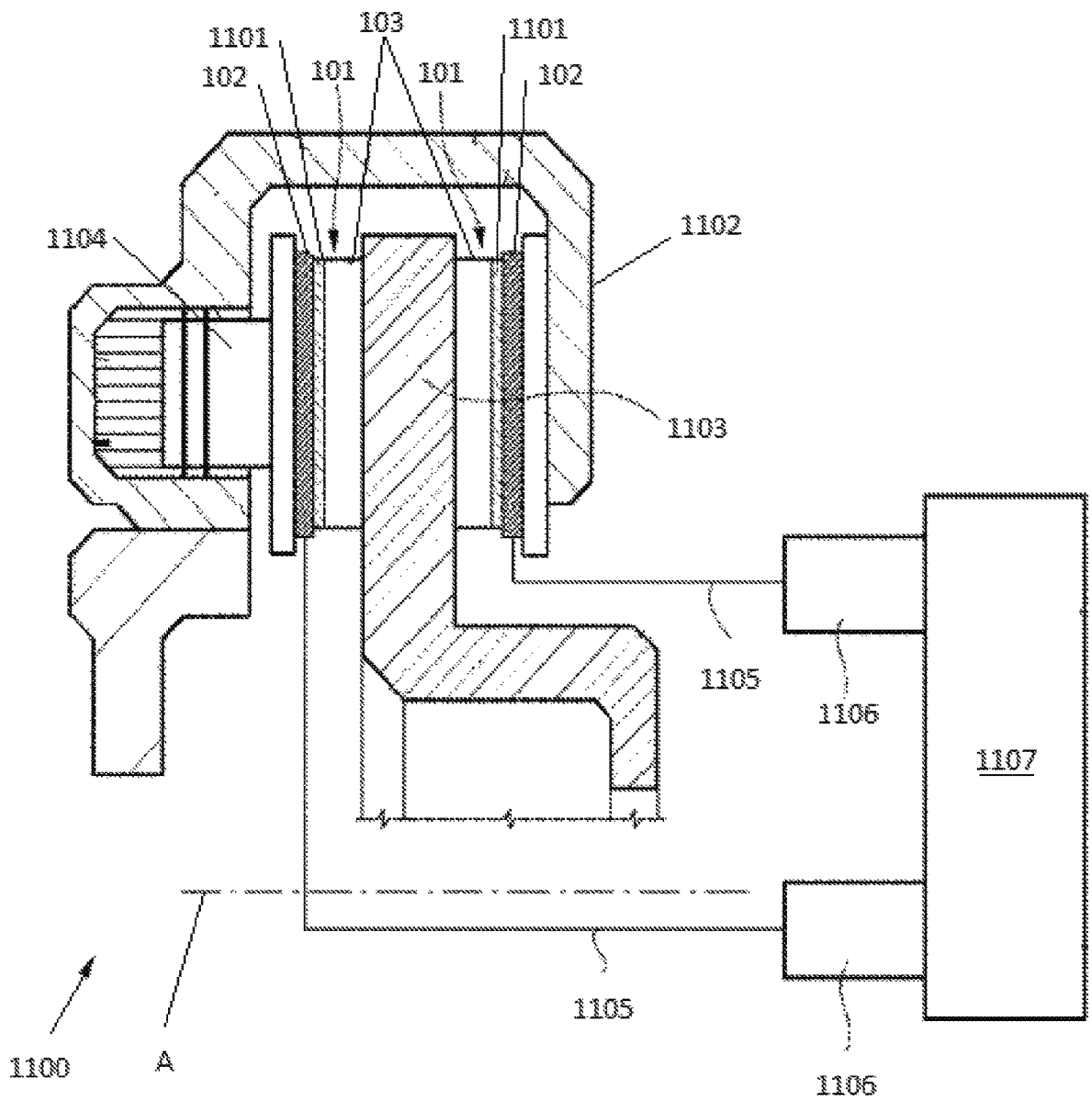
FIG. 2 illustrates a side view of a braking unit, such as a braking unit of the vehicle of FIG. 1.

FIG. 2 shows a braking unit 1100 of a vehicle, such as the heavy truck shown in FIG. 1, or another automobile or other vehicle. The braking unit 1100 can include a caliper 1102 and a disk shaped rotor 1103 rotating about an axis of the wheel of the vehicle. The braking unit 1100 can include a braking device 101, such as a brake pad or brake shoe. Two opposite braking devices 101 are movable by a corresponding piston 1104 so that friction material 103 thereof may engage or disengage the opposite sides of the disk shaped rotor 1103. Signals coming from one or both braking devices 101, such as from one or more sensors included in the braking devices 101 or otherwise incorporated into the braking unit 1100, can be transmitted via cables 1105 to a processing unit 1107, which can include a signal conditioning device comprising analog front ends 1106 and digitalization. As will be discussed in more detail below, signals from the braking devices 101 can be used to aid in sensing information relating to operation of the braking unit, which can be used to detect and remedy undesirable operation of the braking devices 101, among other beneficial uses.

Braking Devices with Sensors

Figure 3:
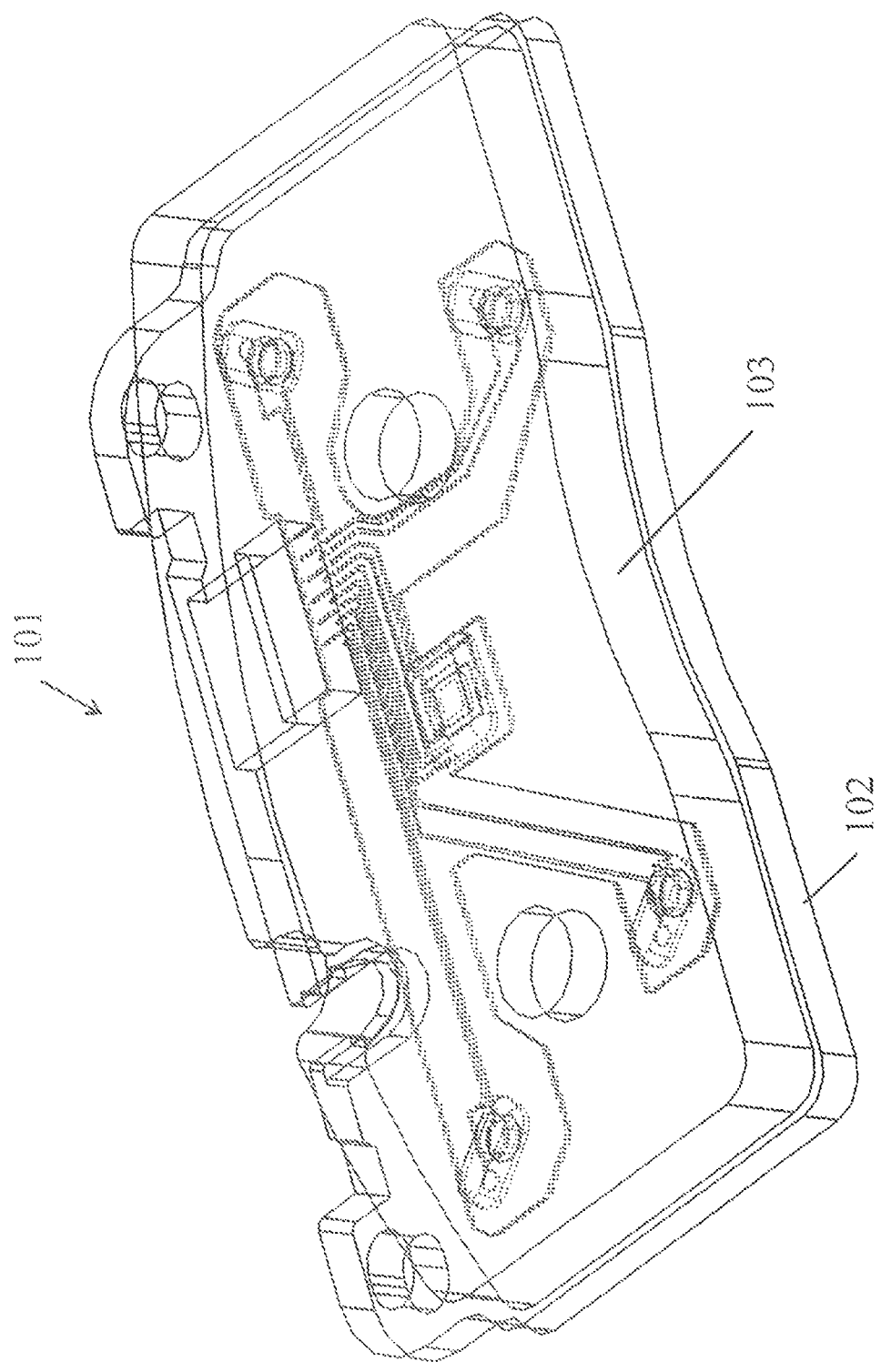
FIG. 3 schematically illustrates a perspective view of a braking device.
Figure 4:
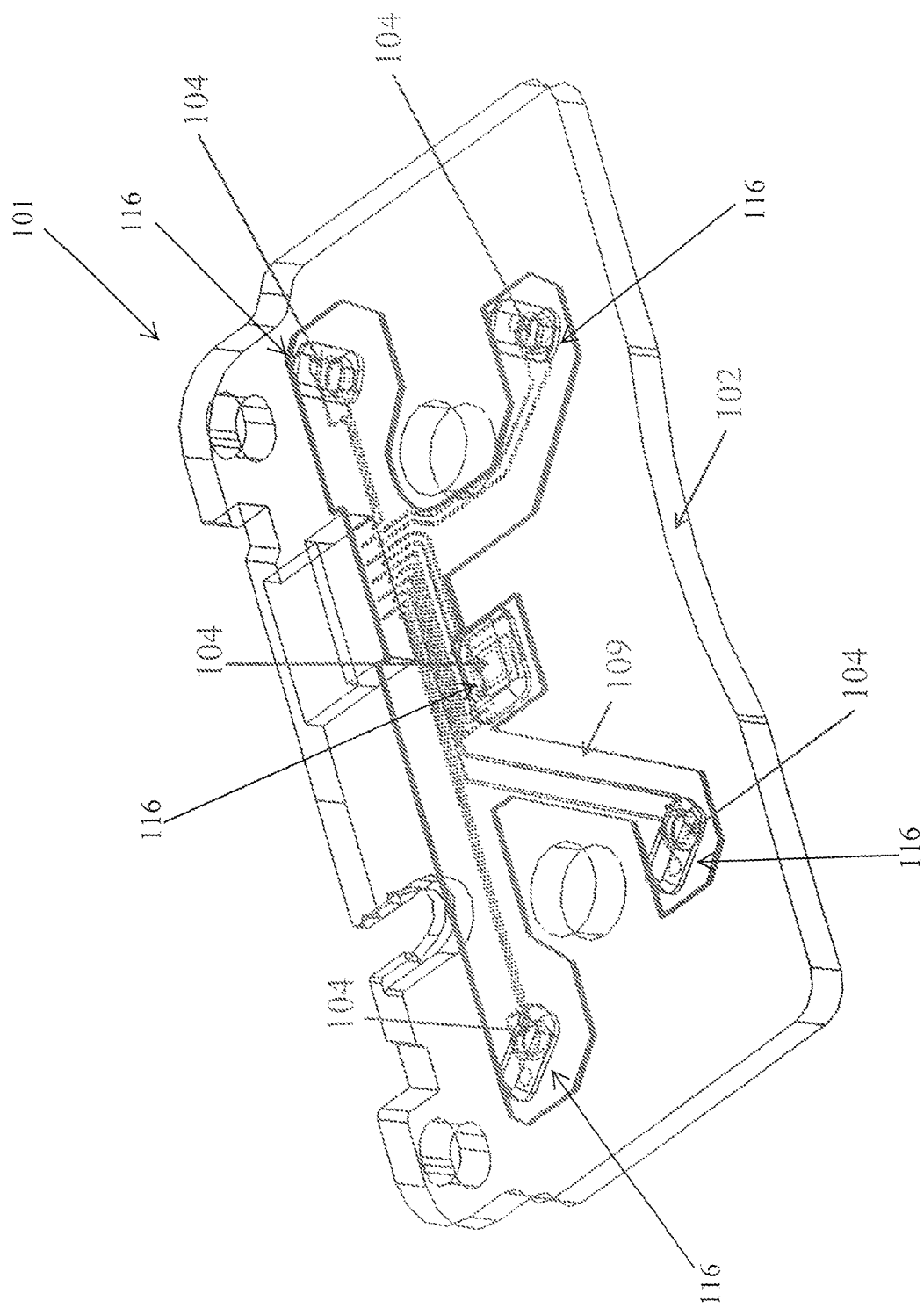
FIG. 4 illustrates a perspective view of the braking device of FIG. 3 without the block of friction material.

FIGS. 3 and 4 illustrate the braking device 101. For purposes of presentation, the braking device 101 shown in the figures, and discussed below, is described as a brake pad. However, the braking device 101 can take many other forms, such as a brake shoe or otherwise.

As shown, the brake pad 101 comprises a support element 102, which can be called a "backplate." The backplate is preferably but not necessarily metallic. The brake pad 101 can include a block of friction material 103 supported by the support element 102. The brake pad 101 can include one or more sensors 104, such as piezoceramic sensors. The sensors 104 can be supported by the support element 102. The sensors 104 can be interposed between the support element 102 and the block of friction material 103. As shown, the piezoceramic sensors 104 can be supported in a raised arrangement on the support element 102.

The support element 102 in particular is shaped as a contour shaped flat plate having a first main planar surface 105 that is intended in use to face an element to be braked, such as a vehicle brake disc, and a second main planar surface 106 that is parallel to the first main planar surface 105. The block of friction material 103 has, in particular, a first main planar surface 107 that is conjugated to the first planar surface 105 of the support element 102 and a second planar surface 108 that is parallel to the first planar surface 107, and intended in use to direct contact with the element to be braked.

The piezoceramic sensors 104 are able to detect the forces that are exchanged in use during the contact between the brake pad 101 and the element to be braked as a result of their inherent ability to emit an electrical signal when subjected to a mechanical stress. As shown, the support element 112 supports an electrically insulated electrical circuit 109. The circuit 109 has electrical contacts to which electrodes of the piezoceramic sensors 104 are connected. The electrical circuit 109 receives and transmits electrical signal, which is generated without the need for an electrical power supply from piezoceramic sensors 104, when they are subjected to a mechanical stress in the direction of polarization. The electrical signal emitted by the piezoceramic sensors 104 and collected by the electrical circuit 109 can either be processed in real time or at a later point in time.

The piezoceramic sensors 104 are made of piezoceramic materials with a Curie temperature greater than 200° C. and are formed of a preferably cylindrical body that is polarized in the direction of its axis and delimited by a pair of opposite flat faces that are arranged in use parallel to the main planar surfaces of the support element 102. Preferably only one of the faces, in particular, the one facing the electrical circuit 109, has both of the electrical signal sampling electrodes. Specific examples of piezoceramic sensors 104 that may be used are, for instance, PIC 255 (Manufacturer: PI Ceramic), PIC 300 (Manufacturer: PI Ceramic), PIC 181 (Manufacturer: PI Ceramic), PIC 050 (Manufacturer: PI Ceramic), TRS BT200 (Manufacturer: TRS Ceramics), PZT5A1

(Manufacturer: Morgan Advanced Ceramic), PZT5A3 (Manufacturer: Morgan Advanced Ceramic). While piezoceramic sensors are shown, other types of piezoelectric sensors or other types of pressure sensors can be used in various implementations.

The electrical circuit 109 has branches that are suitably shaped in order to arrange the piezoceramic sensors 104 in discrete positions on the support element 102 and is also provided with an integrated electrical connector at the edge of the support element 102.

While not shown in FIGS. 3 and 4, in some embodiments, one or more temperature sensors and/or one or more shear force sensors that are electrically connected to the electrical circuit 109 may be mounted on the support element 102. The electrically insulated electrical circuit 109 is preferably screen printed and applied directly onto the support element 102. For instance, the shear force sensors can be piezoceramic sensors oriented so as to detect shear forces (e.g., lateral forces) between the brake pad 101 (e.g., the friction material 103) and the element to be braked, whereas pressure sensors can be piezoceramic sensors oriented to detect normal forces between the brake pad 101 (e.g., the friction material 103) and the element to be braked.

In certain implementations, some or all of the sensors on the support element 102 are installed onto the electrically insulated electrical circuit 109 from the side of the latter that faces the block of friction material 103. The sensors that are thus integrated into the support element 102 are highly capable of measuring the forces acting on the brake pad 101 during braking or in general during the running of the vehicle.

A damping layer 1101 (see FIG. 2) can be provided that is interposed between the block of friction material 103 and the support element 102. The damping layer 1101 can have a first main surface that is conjugated to the first planar surface of the support element 102 and a second surface that is conjugated to the first planar surface of the block of friction material 103. The damping layer 1101 can be mostly made of phenolic resin material.

In some configurations, each piezoceramic sensor 104 is embedded within or otherwise covered and protected by a protective element 116 (also called a protective layer). The protective element 116 can be located on the support element 102 at the position of the piezoceramic sensor 104. For the electrical insulation of the piezoceramic sensor 104 the protective element 116 can be made of electrically insulating material.

The protective element 116 can have mechanical properties, such as an elastic modulus that has been carefully chosen in order to limit the force transmitted to the piezoceramic sensor 104 when an external compression force is applied to the block of friction material 103. Further details regarding this and other aspects of the brake pad can be found in International Application No. PCT/IB2013/060881, filed Dec. 12, 2013 and U.S. patent application Ser. No. 15/184,806, filed Jun. 16, 2016, the entirety of each of which is hereby incorporated by reference herein.

The protective element 116 can be configured to direct at least part of the external compression force to an area of the support element 102 surrounding the piezoceramic sensor 104 itself. This can be beneficial because, for example, a considerable external compression force is in fact generated during the hot pressing of the block of friction material onto the support 102.

In various embodiments, the protective element 116 substantially or completely embeds the piezoceramic sensor 104. The protective element 116 can be made of a resin-based material, for example, the material for the protective element can include one or more of: polyimide resins, epoxy resins (loaded or not), Bismaleimide resins, and Cyanate-Ester resins. In certain implementations, the protective element can be made by dripping the material at a standard pressure and moderate temperatures (such as less than about 200° C.) prior to forming the block of friction material 103. Ceramic materials that are much harder than resins and suitable for temperatures above 350° C. may however also be used for the protective element.

In some embodiments, some or all of the sensors and/or other components of the electrical circuit 109 have a respective protective element, such as a protective element of the same type as that described above. In various embodiments, due to the protection provided by the protective element 116, the forces actually experienced by the sensors during the production of the brake pad 101 or when the brake unit is in operation is reduced.

Certain Vehicle Systems

Figure 5:
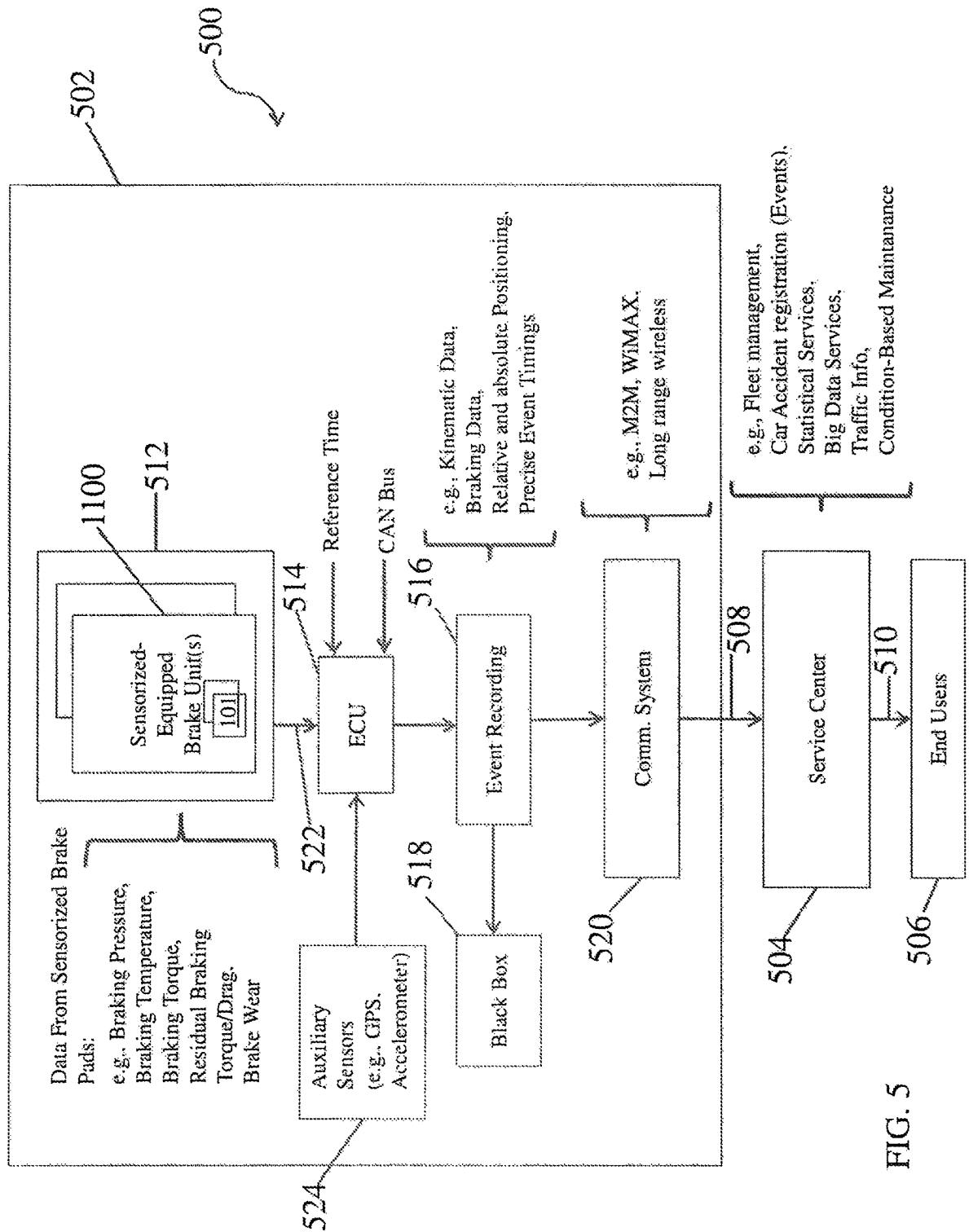
FIG. 5 illustrates a system including one or more vehicles incorporating sensor-equipped brake units, in communication with a computing system of a service center.

FIG. 5 schematically illustrates a block view of a system 500 for generating, analyzing, and managing information generated by one or more vehicles 500, including information generated by one or more sensorized braking units 1100.

The system 500 includes one or more vehicles 502, a computing system 504 associated with the vehicles 502 such as a service center, fleet management center or other vehicle-related entity, and one or more end user computing devices 506 associated with users of the computing system 504.

The vehicles 502 can be in communication with the computing system 504 via one or more appropriate wireless networks 508, which can be a wide area network (WAN). For instance, the vehicles 502 can communicate with the computing system 504 according to some or all of the following wireless standards, without limitation: Global System for Mobile (GSM), General Packet Radio Service (GPRS), Code Division Multiple Access (CDMA), 3G, 4G, and/or Long Term Evolution (LTE), Worldwide Interoperability for Microwave Access (WiMAX) network, machine-to-machine (M2M), Wi-Fi, long range Wi-Fi, Universal Mobile Telecommunications System (UMTS), High-Speed Downlink Packet Access (HSDPA), or another long range wireless standard. The vehicles 502 and the computing system 504 can also be configured for wired communication with one another and/or communication over a local area network (LAN), such as when the vehicles are located at a service center, for example. The vehicles 502 can also be configured to communicate with one another via any appropriate network, such as an M2M network.

The computing system 504 and the user computing devices 506 can communicate with one another via a network 510, which may be a wireless or wired network, such as a local area network (LAN), and which can include any of the foregoing types of networks, or some other network. For instance, the user computing devices can include workstations or portable devices (e.g., smartphones, laptops, tablets, etc.) of employees or other users associated with the entity that operates the computing system 504. The computing system 504 can include one or more servers and/or other computing devices, which can be networked among one another, as well as one or more storage devices (e.g., flash memory, disk drives, tape drives, etc.), which can be used to store sensor information and other information received from the vehicles 502.

The vehicles 502 can include any of the types of vehicles discussed herein, without limitation, such as one or more cars, trucks, trains, air planes, etc. As shown, the illustrated vehicle 502 includes a brake system 512, a vehicle computing system 514, a recording unit 516, a data repository 518, a communication interface 520, and one or more auxiliary sensors 524.

The brake system 512 includes one or more braking units 1100, which can include one or more sensor-equipped brake elements 101, such as a brake pad or shoe. For instance, the brake system 512 can include one brake unit 1100 per wheel, each of which includes one, two, or more brake elements 101. The brake units 1100 and corresponding brake elements 101 can include any of the sensor-equipped brake units and brake elements described herein, such as those shown and described with respect to FIGS. 2-4, 7, and 8, and which can include without limitation one or more pressure sensors, shear sensors, and/or temperature sensors.

The vehicle computing system 514 can comprise a central control unit such as an electronic control unit ("ECU") of the vehicle 502. The vehicle computing system 514 can include multiple separate computing devices of the vehicle, including some or all of the vehicles on-board computers. The computing system 514 is in communication with the braking system 512 via a connection 522, which can include one or more wired or wireless communication channels (e.g., a CAN-bus). The computing system 514 can be capable of receiving (e.g., in real time) data over the connection 522 from the sensorized brake units 1100. The data can include data relating to the temperature, pressure, torque, residual torque, or wear associated with the brake element 101, such as the pressure or torque between the block of friction material and the disk or drum of the vehicle when the braking system is activated by the user, temperature within the braking element 101 during activation of the braking system, or residual torque between the block of friction material and the disk or drum when the braking system is deactivated, i.e. after brake system activation, when the user no longer exerts any pressure on the brake pedal. Techniques for determining wear and residual torque from piezoceramic sensor information collected using sensorized brake elements are provided in U.S. Patent Application Publication No. 2016/0084331, filed on Apr. 16, 2014, which is hereby incorporated by reference herein.

The vehicle computing system 514 can include or be in communication with a number of additional on-board computing devices and componentry, including for example, a body control module (BCM), air bag modules, anti-lock braking system (ABS), etc.

The vehicle computing systems 514 can also be in wired or wireless communication with one or more auxiliary sensors 524 or other electronic devices, such as over one or more vehicle buses. The auxiliary sensors 524 can be positioned within the vehicle, mounted to an exterior of the vehicle, or otherwise supported by the vehicle, and can include without limitation one or more location sensors (e.g., Global Positioning System receivers), acceleration sensors, speed sensors, velocity sensors, gyroscopes, thermometers, or the like. In some implementations, the auxiliary sensors 524 are included within the brake system 512, and can be included in the brake element(s) 101, for example.

The vehicle 502 can include one or more clocks, which can provide a reference time to the vehicle computing system 514 and/or to other components of the vehicle 502. Moreover, the vehicle 502 can include a common network, which can be implemented according to the Controller Area Network (CAN bus) vehicle bus standard, allowing the various computing devices within the vehicle 502 to communicate with each other, including some or all of the components of the vehicle 502 shown in FIG. 5, without limitation.

In some implementations the vehicle computing system 514 can combine information received from multiple sensors to determine a position and/or kinematic state of the vehicle. For instance, in some embodiments, the auxiliary sensor(s) 524 includes a GPS receiver configured to provide geo-referenced location data, as well as an accelerometer, and the vehicle computing system 514 can process the data received from the GPS receiver and the accelerometer to determine an exact position (e.g., latitude and longitude coordinates) and kinematic state (e.g., position, velocity, and/or acceleration) of the vehicle 502. In other embodiments, a different type of location determining device can be used in place of the GPS receiver, and a speed or velocity sensor can be used in place of the accelerometer to achieve a similar result.

In general, the computer system 514 can receive any of the on board data concerning the state of the vehicle acquired by the on board computing systems within the vehicle 502, and can be configured to analyze and manage the data.

The recording unit 516 is coupled to the vehicle computing system 514 and receives data from the computing system 514. The recording unit 516 can comprise one or more storage devices (e.g., magnetic drives or solid state drives) and/or one or more processors.

A variety of different types of data can be received by the event recording unit from the vehicle computing systems 514 (and/or directly from the brake units 1100 or other sources such as the auxiliary sensors 524). Such information can include, without limitation: braking data (e.g., pressure, temperature, torque, residual torque, wear), kinematic data (e.g., vehicle position, velocity, acceleration), relative and/or absolute vehicle position, information relating to occurrence of events and/or of the time occurrence such events, including accidents/collisions, malfunctioning of the brake system or other vehicle components, abrupt changes in speed, etc. For instance, the vehicle computing system 514 can receive a reference time from an on-board vehicle clock, and associate detected or determined events with a time of occurrence using the reference time.

A data repository 518 which can be referred to as a "black box" can be removably mounted to the vehicle 502, and be capable of storing any of the data generated by the brake system 512 and other components of the vehicle 502 such as the auxiliary sensors 524 and the vehicle computing system 514. For instance, in some embodiments the data repository 518 is removably mounted to the vehicle 502, is an onboard component of the vehicle 502, and/or capable of preserving some or all of the data described herein, and can thus be used in a variety of manners, such in the case of an accident, to learn information about the accident.

The illustrated recording unit 516 is also connected to a communication interface 520, which can be capable of long-range communication and can include a radio module or other transmission module configured to implement any appropriate wireless protocol including any of those described herein, such as GSM, GPRS, CDMA, 3G, 4G, (LTE), WiMAX, M2M, Wi-Fi, long range Wi-Fi, UMTS, HSDPA, and M2M. The communication interface can be configured to transmit data over a mobile telephone network, for example, for real-time communication, while respecting privacy regulations. The communication interface 520 can be a component of the on-board system of the vehicle 502.

In the illustrated embodiment, the communication unit 520 is connected to the computing system 504 via the network 508, e.g., via a wireless WAN connection, providing electronic communication between the vehicle(s) 502 and the computing system 504.

Certain Techniques for Using Sensor-Equipped Brake Pad Data

In some embodiments, data collected from the auxiliary sensors 524 can be utilized together with the brake system data. For instance, location data from a GPS receiver can be stored together with brake system data to determine brake system 512 behavior at a given location of the vehicle 502. This can allow for analysis of brake system behavior (e.g., pressure, temperature, torque, residual torque, and/or wear) over the course of a trip, when the vehicle 502 is driving over different terrain, etc. Where the auxiliary sensors 524 include an accelerometer, acceleration data can be combined with data collected by the GPS receiver to determine a more accurate position (e.g., exact latitude and longitude coordinates) than that provided by the GPS receiver, as well as a kinematic state (e.g., velocity, and/or acceleration) of the vehicle 502. Depending on the embodiment, such information can be retrieved from the data repository 518 or other on-board storage, or can be transmitted in real time over the network 508 to the computing system 504.

According to additional embodiments, data from one or more sensorized brake systems 512 can be used to learn about operation of the vehicle 502 around the time an accident or other event occurred. For instance, braking pressure, temperature, braking torque, or residual torque collected from the brake system 512 can be stored in the data repository 518 along with data usable to determine that an accident has occurred. As one example, data from an on-board vehicle computer indicating that an air bag has deployed can be stored together with the braking system data, along with a reference time stamp derived from a vehicle clock. In this manner, the stored brake pad data corresponding to a time at or around the time of the air bag deployment/impact can be reviewed to assess brake system operation during the relevant time period. Other on-board data can be used to determine when an accident has occurred. For instance, accelerometer data can be analyzed to identify severe deceleration beyond a threshold, indicative of a collision. Depending on the embodiment, such information can be retrieved from the data repository 518 or other on-board storage, or can be transmitted in real time over the network 508 to the computing system 504.

Information collected by the sensorized brake system 512 can also be used to determine when brake system or other vehicle maintenance is appropriate. For instance, brake pad wear information can be collected by the brake system 512 or be generated by the vehicle computing system 514 or other on-board processor. When the wear information indicates that brake system maintenance is appropriate, the vehicle computing system 514 can trigger an indicator light or other warning to the user. Or, in some embodiments, the information is transmitted via the network 508 to the computing system 504. For instance, in some implementations, the computing system 504 is operated by a rental car company or fleet management company, and wear information and/or other brake system data is communicated from a fleet of vehicles 502 to the computing system 504. The computing system 504 can process the information to determine that maintenance is appropriate for a particular vehicle 502, and send an electronic notification to an end user device 510.

In some embodiments, data collected by the vehicle 502 indicating or usable to determine that an accident or vehicle fault or malfunction (e.g., brake system malfunction) has occurred 502 is transmitted, e.g., in real time, over the network 508 to the computing system 504. A resulting notification is sent to an end user device 510, providing the ability to provide quick response in the case of an accident or technical fault. In the case of vehicle impact, data provided by the vehicle 502 over the network 508 can be used to determine a severity of the impact. For example, data can be communicated from the vehicle 502 to the computing system 504 indicating that an impact has occurred (e.g., acceleration data), and also indicating whether an airbag deployed (likely severe) or did not deploy (likely less severe). Moreover, the vehicle 502, computing system 504, or end user device 506 can automaticlly make a call to an emergency call center using a preset number, transmitting precise information to the operators regarding the location of the accident and any other relevant information that may be useful in calling the emergency services.

The data collected by the vehicle(s) 502 can also be used in an insurance context. For instance, the computing system 504 can be operated by an insurance company, and data provided by the vehicle 502 can be utilized to identify and prevent insurance fraud. For instance, data collected by the brake system 512, auxiliary sensors 524, or other on-board components can used to verify statements made by insured drivers relating to accidents they were involved in. Such data can also be used to derive customized insurance rates, resulting in substantial cost savings. For instance, data collected by the brake system 512, auxiliary sensors 524, or other on-board components can be used to assess individual driving behavior and corresponding statistical likelihood of accidents/insurance claims. The computing system 104 can additionally process data from multiple vehicles (10's, 100's, 1000's, or more) in the aggregate to detect brake system usage patterns or the like.

The data generated by the vehicle 502 can be used in a variety of contexts. As just few possibilities, the data can be communicated and/or used by the user of the vehicle, an automotive fleet management company, a vehicle insurance company, a statistics firm, a traffic management company, a vehicle maintenance company, and/or a vehicle production and sales company.

Certain Brake Systems and Brake Elements

FIG. 6 schematically illustrates an example of a portion 1 of a vehicle system including a plurality of control units 11, 12 and one or more sensor-equipped brake elements 101 (e.g., brake pads or shoes). For instance, the portion 1 may correspond to a portion of the vehicle system 502 of FIG. 5, including the brake system 512 and the vehicle computing system 514 or a portion thereof. As described above, the brake units 1100 can comprise a caliper with two brake pads 101 that can be activated onto a disk brake. In some variants, the brake units 1100 comprise brake shoes that can be activated against a drum brake.

Figure 7:
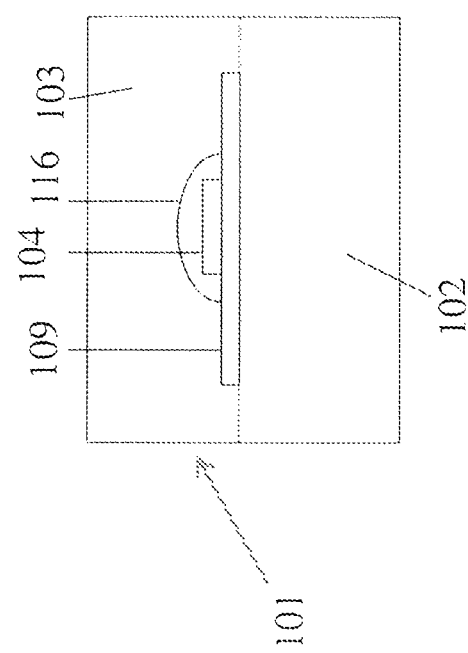

FIG. 7 shows a side view of a compatible brake pad 101 including a support element 102 and a block of friction material 103 connected with or otherwise supported by the support 102, and configured to act upon the associated disk brake. The illustrated brake pad 101 includes at least one pressure sensor, which can be at least one piezo-electric sensor such as a piezoceramic sensor 104, and can additionally include at least one temperature sensor (not shown) and/or at least one piezoceramic shear sensor (not shown). The sensor(s) 104 can be interposed between the block of friction material 102 and the support element 102. The brake pad 101 components can be designed for use at high temperatures. For example, the components can be configured to operate at a temperature of at least about 600° C.

One or more of the sensors 104 can comprises at least one protective element 116 to protect it preferably from the high pressures, temperatures and forces acting upon it. For instance, the illustrated brake element 101 includes a protective element 116 covering the piezoceramic sensor 104. The protective element 116 is preferably made of an electrically insulating material with mechanical properties that limit the force transmitted to the piezoceramic sensor 3 when an external compression force is applied to the block of friction material 2. The protective element 116 can be configured to direct at least part of the external compression force to an area of the support element 102 surrounding the piezoceramic sensor 104. Where additional sensors are included, the brake pad 101 can include a similar protective element for any the other sensors can include a similar protective element, such as the temperature sensor and/or shear sensors. Examples of compatible protective elements are provided in U.S. Pat. No. 9,415,757.

The support element 102 can include an electrically insulated electrical circuit 109 disposed thereon, which can have electrical contacts connected to electrodes of the sensor(s) 104 for the acquisition of an electrical signal output by the sensor(s) 104, and can have contacts connected to the electrodes by means of a high temperature solder paste. For example, the electrical circuit 109 can be integrated into the support 102, such as by heat resistant screen printing technology (e.g., glass ceramic material). Any other sensors such as the temperature sensors can also be mounted onto the electrically insulated electrical circuit 109, which can be integrated onto the support element 102. Thus, the electrical circuit 109 can also have electrical contacts connected to the electrodes of any such additional sensors.

Figure 8:
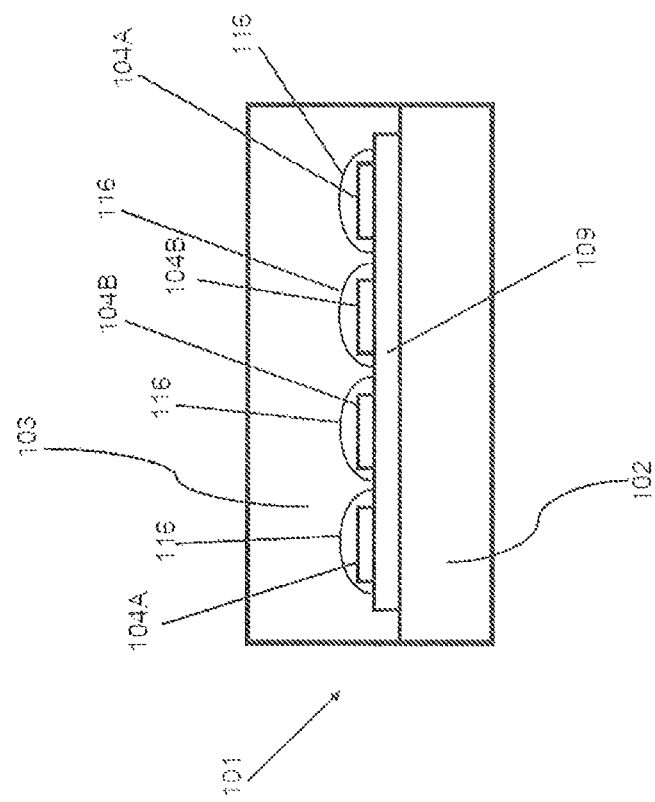
FIGS. 7 and 8 illustrate embodiments of sensor-equipped brake pads.

FIG. 8 illustrates a schematic side view of another compatible brake pad 101 illustrating multiple sensors, and which can be identical or similar to other brake pads 101 described above, such as with respect to FIGS. 3-4. The brake pad 101 of FIG. 8 includes one or more sensors 104A, 104B. The sensor 104A can comprise a temperature sensor, such as PT1000 sensors. In some embodiments, the brake pad 101 includes only one temperature sensor 104A. In certain variants, the brake pad 101 comprises a plurality of temperature sensors 104A. In some embodiments, the sensor 104B comprises a pressure sensor (e.g., a piezoceramic pressure sensor) and/or a shear sensor (e.g., a piezoceramic shear sensor). Some embodiments comprise only one sensor 104B. Some variants include a plurality of the sensors 104B. Some or all of the sensors 104A, 104B and the electrical circuit 109 can be covered by a protective element 116. The protective layer can be made of electrically insulating material. In some embodiments, the protective layer comprises a ceramic material.

With regard to FIG. 6 again, each control unit 11 can comprise a peripheral control unit, and the control unit 12 can comprise a central control unit. For instance, some or all of the control units can comprise or form a part of the vehicle computing system 514 of FIG. 5. Various embodiments have one or more of the peripheral control units 11 and/or the central control unit 514. For example, the vehicle can include 1, 2, 3, 4, 5, 6, 7, 8, or more peripheral control units 11 and/or 1, 2, 3, 4, 5, 6, 7, 8, or more central control units 12. In some embodiments, the peripheral control units 11 can be located at or near a respective brake and/or at or near a respective wheel. For example, the vehicle system can include at least one peripheral control unit 11 for each wheel.

Some embodiments include at least one peripheral control unit 11 for each set of wheels on the end of an axle, such as one peripheral control unit 11 for each of the pairs of rear trailer wheels shown in FIG. 1. In certain embodiments, the central control unit 12 is located in a place that is centralized on the vehicle and/or in a place to facilitate service or connection with other components. For example, the central control unit 12 can be located in or near a vehicle on-board electronic system, such as an electronic control unit (ECU). The central control unit 12 does not need to be centrally located, such as in relation to the vehicle overall, the positioning of the peripheral control units 11, the sensors, the wheels, or otherwise.

The peripheral control units 11 can be configured to communicate (e.g., receive signals from) the sensors 104A, 104B of the brakes pads 101. For example, the peripheral control units 11 and sensors 104A, 104B can communicate by a communication interface 8 on the brake pad and a corresponding communication interface 19 on the brake pads 101. In some embodiments, the interface 8 comprises an electrical connector. In some variants, the interface 8 comprises a wireless connection (e.g., RF transmitter and receiver). The connector can be configured to electrically couple with the electrical circuit 109. The connector 109 can be configured to transmit electrical signals from the sensors 104A, 104B to one or more components on the outside of the brake pad 101 (e.g., the unit 11) for processing.

The peripheral control unit 11 can comprise a memory 13, a processor 20, and an electrical power supply 21. The peripheral control unit 11 can have an A/D digitization stage 22 that transforms the analog signals from the sensors 104A, 104B into digital signals. The peripheral control unit 11 can have a digital signal conditioning stage 23. The processor 20 of the peripheral control unit 11 can be programmable to process the incoming digital signals. As illustrated, the peripheral control unit 11 can be connected with the central control unit 12, such as through communication interfaces 15, 16. The communication interfaces can comprise a wired connection (e.g., an electric cable) or a wireless connection (e.g., RF transmitter and receiver). In some embodiments, the peripheral control units 11 are not present, and the central control unit 12 receives sensor information directly from the brake pads 101.

In certain embodiments, the central control unit 12 is configured to concentrate and/or convert the information received from peripheral control units 11 and/or to transmit information to the CAN-bus of the vehicle, such as, for communication with the ECU of the vehicle. The central control unit 12 can include a memory 24 and an electrical power supply 29. The memory 24 can be used to store information received from the peripheral control unit 11 or other information, such as program instructions, sensor-related values (e.g., measured temperatures, measured pressures, measured shear values, threshold temperatures, threshold pressures, threshold shear values, etc.). For instance, the memory 24 can comprise or form a part of one or more of the black box 518 of the vehicle 502 of FIG. 5.

The communication interface 17 can be cabled or wireless, and can be configured to communicate with other computing devices within the vehicle, or off-vehicle. For instance, the communication interface 17 can correspond to the communication interface 520 of FIG. 5.

This is of course just one example among the various possible configurations for the control units 11, 12. Another possible configuration has a single peripheral control unit 11 for handling the sensors 104A, 104B of all the brakes. In another contemplated variation, the central control unit 12 integrates all of the functions including those of the peripheral control units 11. For example, the central control unit 12 can be connected with the brake pads 101 without a separate intervening peripheral control unit 11. Some embodiments include a plurality of peripheral control units 11, each located at a respective wheel of the vehicle. This can be beneficial since each peripheral control unit 11 can be located at or near its respective wheel. Some variants include a single peripheral control unit 11, which can be beneficial in consolidating components and functionality and/or by positioning the peripheral control unit 11 in a central location between the wheels. In some implementations, the vehicle CAN-bus can be connected to the peripheral control units 11 in addition to, or instead of, the central control unit 12. In any case, the connection to the CAN-bus can be achieved by radio links such as Bluetooth, Wi-Fi or other radio protocols and standards based upon RF technology.

In some implementations, the electrical power supplies 21, 29 are configured to harvest and/or absorb energy from the motion of the vehicle, such as in the form of vibrational, kinetic, and/or thermal energy that can be converted into electrical energy. The electric components of the system 1 (e.g., the controllers 11, 12) can be powered by the electrical energy converted from the energy absorbed from the motion of the vehicle. In some embodiments, the energy harvester comprises a piezoelectric crystal, thermoelectric generator, or otherwise. The electrical energy can be stored in a storage device, such as a battery or capacitor.

Certain Additional Numbered Embodiments

1. A device for analyzing and managing data generated by a sensor-equipped braking system for vehicles, comprising a support element for a block of friction material and a sensor interposed between the block of friction material and the support element, characterized in that it comprises at least a central control unit capable of receiving in real time from said sensor at least basic data related to the pressure of the activated braking system, the temperature of the activated braking system, the braking torque and/or the residual torque when the braking system is deactivated and the wear on the braking system during and after the activation thereof.

2. The device for analyzing and managing data generated by a sensor-equipped braking system for vehicles according to numbered embodiment 1, characterized in that said sensor comprise at least one temperature sensor provided between said block of friction material and said support element.

3. The device for analyzing and managing data generated by a sensor-equipped braking system for vehicles according to the previous numbered embodiment, characterized in that said at least one temperature sensor is mounted on an electrically insulated electrical circuit which is integrated in the support element.

4. The device for analyzing and managing data generated by a sensor-equipped braking system for vehicles according to the previous numbered embodiment, characterized in that the electrically insulated electrical circuit is screen printed on the support element.

5. The device for analyzing and managing data generated by a sensor-equipped braking system for vehicles according to numbered embodiment 1, characterized in that said at least a central control unit is connected to a GPS and to an accelerometer so as to receive first auxiliary data on the position and kinematic state of said vehicle, said basic data and said first auxiliary data being analyzed simultaneously with all the onboard data on the state of the vehicle acquired directly from the onboard systems of the vehicle.

6. The device for analyzing and managing data generated by a sensor-equipped braking system for vehicles according to numbered embodiment 5, characterized in that it comprises at least a recording unit connected to said central control unit for the simultaneous real-time recording of said basic data, said first auxiliary data, said onboard data analyzed by said central control unit, said recording unit being connected on one side to a black box for storing all said data and on the other side to a long-range communication unit.

7. The device for analyzing and managing data generated by a sensor-equipped braking system for vehicles according to numbered embodiment 6, characterized in that said long-range communication unit comprises at least a transmission module for transmitting said data via a telephone network of a mobile telephone.

8. The device for analyzing and managing data generated by a sensor-equipped braking system for vehicles according to numbered embodiment 6 or 7, characterized in that said black box or said long-range communication unit are components of the onboard system of the vehicle.

9. The device for analyzing and managing data generated by a sensor-equipped braking system for vehicles according to any numbered embodiment 6 to 8, characterized in that said communication unit is connected to a service centre, which is able to communicate said data at least to the user of the vehicle and/or an automobile fleet management company and/or vehicle insurance company and/or statistics firm and/or traffic management company and/or vehicle maintenance company and/or vehicle production and sales company.

10. The device for analyzing and managing data generated by a sensor-equipped braking system for vehicles according to numbered embodiment 1, characterized in that said sensor comprises at least one piezoceramic sensor and in that it comprises at least one protective element enclosing said at least one piezoceramic sensor so as to protect it preferably from high pressures, temperatures and forces acting upon it, said protective element being preferably made of electrically insulating material with mechanical properties such as to limit the force transmitted to the piezoceramic sensor when an external force of compression is applied on said block of friction material.

11. The device for analyzing and managing data generated by a sensor-equipped braking system for vehicles according to numbered embodiment 10, characterized in that said protective element is configured to direct said external force of compression at least in part onto an area of the support element surrounding said at least one piezoceramic sensor.

12. A vehicle characterized in that it incorporates at least an analysing device according to any numbered embodiment.

Certain Terminology

Some operations described herein can be performed in real-time or near real-time. As used herein, the term "real-time" and the like, in addition to having its ordinary meaning, can mean rapidly or within a certain expected or predefined time interval, and not necessarily immediately. For instance, real-time may be within a fraction of a second, a second, or a few seconds, or some other short period of time after a triggering event.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a device configured to carry out recitations A, B, and C" can include a first device configured to carry out recitation A working in conjunction with a second device configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

SUMMARY

Various systems, devices, and methods have been disclosed in the context of certain embodiments and examples above. However, this disclosure extends beyond the specifically disclosed embodiments to other alternative embodiments and/or uses and obvious modifications and equivalents thereof. In particular, while the systems, devices, and methods has been described in the context of illustrative embodiments, certain advantages, features, and aspects of the devices, systems, and methods may be realized in a variety of other applications. Various features and aspects of the disclosed embodiments can be combined with or substituted for one another in order to form varying modes of the devices, systems, and methods. The scope of this disclosure should not be limited by the particular disclosed embodiments described herein.

The systems, devices, and methods described above are susceptible to numerous modifications and variations, all falling within the scope of the inventive concept; moreover all of the components can be replaced by technically equivalent elements. Additionally, various aspects and features of the embodiments described can be practiced separately, combined together, or substituted for one another. A variety of combination and subcombinations of the disclosed features and aspects can be made and still fall within the scope of this disclosure. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of this disclosure. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples have been disclosed. Although the systems and methods have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

What is claimed is:

1. A system including a sensor-equipped braking device for a vehicle, the system comprising:
   a braking device comprising:
      a support;
      a friction material connected to the support;
      a pressure sensor configured to measure pressure associated with braking operation of the braking device; and
      a shear force sensor;
   one or more memory devices; and
   a computing system configured to:
      receive first data corresponding to one or more measurements output by the pressure sensor and the shear force sensor;
      receive second data associated with operation of the vehicle other than braking operation, the second data including data corresponding to one or more measurements output by a second sensor positioned with respect to the vehicle separate from the braking device, the second data further including data indicating whether or not an airbag of the vehicle has deployed;
      analyze at least one of the first data and the second data to determine an occurrence of an event associated with the vehicle; and
      store, in the one or more memory devices, the first data corresponding to a time of the event associated with the vehicle, the first data including data relating to at least braking torque measured while the braking device is activated and residual braking torque measured when the braking system is deactivated and the user is not exerting pressure on the brake pedal.

2. The system of claim 1, wherein the event is a vehicle collision.

3. The system of claim 1, wherein the pressure sensor is configured to measure a normal force.

4. The system of claim 1, wherein the second data comprises vehicle kinematics data.

5. The system of claim 4, wherein the second sensor comprises an accelerometer configured to generate the second data.

6. The system of claim 1, wherein the analysis of the at least one of the first data and the second data comprises comparing the at least one of the first data and the second data to a threshold.

7. The system of claim 6, wherein the computing system is further configured to output a notice regarding the occurrence of the event to an end user device.

8. The system of claim 6, wherein the computing system further comprises a communication unit configured to wirelessly transmit data regarding the occurrence of the event over a wide area network.

9. The system of claim 8, wherein the computing system is further configured to forward to the communication unit for wireless transmission data indicating a notification of a malfunction of the braking unit.

10. The system of claim 1, wherein the second sensor is disposed external to the braking device.

11. The system of claim 1, wherein the computing system is further configured to:
   receive reference time information; and
   store, in the one or more memory devices, the first data and the second data with reference time information at the time when the event occurs.

12. A system configured to analyze data generated by a sensor-equipped braking device, the system comprising:
   an input configured to receive first data corresponding to measurements output by a pressure sensor and a shear force sensor positioned between a friction material and a support of a braking device of a vehicle, the friction material connected to the support, the input further configured to receive second data associated with operation of the vehicle other than braking operation, the second data including data corresponding to one or more measurements output by a second sensor positioned with respect to the vehicle separate from the braking device, the second data further including data indicating whether or not an airbag of the vehicle has deployed;
   a computing system configured to:
      receive the first data and the second data;
      analyze the second data to determine an occurrence of an event associated with the vehicle;
      access first data corresponding to the event; and
      analyze the accessed first data corresponding to the event to assess braking system operation during the event, the first data including information relating to at least braking torque measured while the braking device is activated, and residual braking torque measured when the braking system is deactivated.

13. A method of storing sensor data generated by sensors of a vehicle, the method comprising:
   obtaining first sensor data from a pressure sensor and a shear force sensor positioned between a friction material and a support of a brake pad, the friction material connected to the support;
   obtaining second data including data from a second sensor configured to detect vehicle information, the second sensor positioned with respect to the vehicle and separate from the brake pad, the second data further including data indicating whether or not an airbag of the vehicle has deployed;
   receiving, with a computing system, the first sensor data and the second sensor data;
   analyzing at least one of the first sensor data and the second sensor data to determine an occurrence of an event associated with the vehicle; and
   storing, in one or more memory devices, the first sensor data corresponding to a time of the event associated with the vehicle, the first sensor data including data relating to at least braking torque measured while the braking device is activated and residual braking torque measured when the braking system is deactivated.

14. The method of claim 13, wherein the vehicle information comprises vehicle kinematics.

15. The method of claim 13, wherein the first sensor data and the second sensor data are stored in the one or more memory devices with a time stamp.

16. The method of claim 13, further comprising outputting a notice of the occurrence of the event to an end user device.

17. The method of claim 13, further comprising communicating data regarding the occurrence of the event over a wide area network.

18. The method of claim 13, wherein the event is a braking system malfunction.

\* \* \* \* \*